United States Patent [19]
Bode

[11] 3,779,092
[45] Dec. 18, 1973

[54] FILM WINDING MECHANISM FOR MOTION PICTURE APPARATUS

[75] Inventor: Kurt Bode, Braunschweig, Germany

[73] Assignee: Rollei-Werke Franke & Heidecke, Braunschweig, Germany

[22] Filed: Apr. 14, 1972

[21] Appl. No.: 244,142

[30] Foreign Application Priority Data
Apr. 24, 1971  Germany............P 21 20 188.7

[52] U.S. Cl..................... 74/122, 74/519, 74/575, 74/128
[51] Int. Cl. ........................................... F16h 29/00
[58] Field of Search.................. 74/122, 128, 142, 74/143, 575, 577 M

[56] References Cited
UNITED STATES PATENTS

| | | | |
|---|---|---|---|
| 3,136,167 | 6/1964 | Morner | 74/128 |
| 2,917,933 | 12/1959 | Harris | 74/575 |
| 1,907,673 | 5/1933 | Rockwell | 74/519 |
| 2,619,006 | 11/1952 | Debrie | 74/122 |

FOREIGN PATENTS OR APPLICATIONS
643,169  3/1937  Germany................. 74/143

Primary Examiner—Manuel A. Antonakas
Assistant Examiner—Wesley S. Ratliff, Jr.
Attorney—Charles Shepard

[57] ABSTRACT

A pawl and ratchet drive for the take-up spool of a motion picture camera or motion picture projector, the pawls being driven through a form-locking train including a pair of jaws spring-urged toward each other, embracing a driven pin on a pawl carrier. When the film has been wound to the desired tension, the driving mechanism can continue its normal full stroke without causing full stroke movement of the driven pin on the pawl carrier, so that the film is not wound too tight. In one embodiment, a pair of driving pawls are pivotally mounted on the pawl carrier. In another embodiment, the two pawls are integral with a pawl ring which is swingably mounted on the pawl carrier.

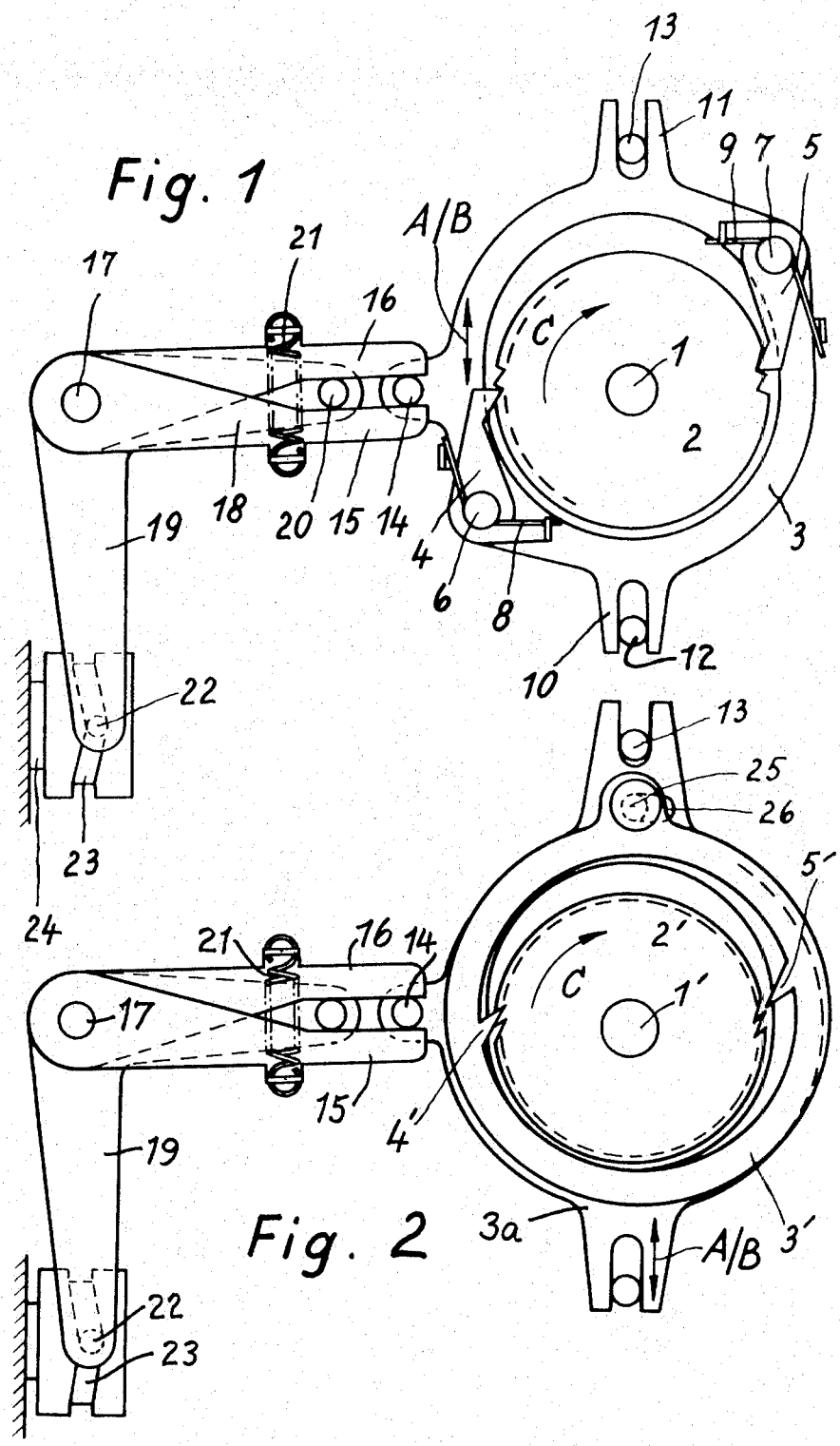

FILM WINDING MECHANISM FOR MOTION PICTURE APPARATUS

BACKGROUND OF THE INVENTION

It has long been recognized that in both motion picture cameras and in motion picture projectors, the take-up spool or reel must be driven faster when a small quantity of film is wound on the spool and the effective diameter of the spool is smaller, than when a larger quantity of film is wound on the take-up spool and the effective diameter thereof is therefore greater. The drive mechanism, however, usually operates at a constant rate, in synchronism with the film advancing mechanism of the camera or projector. The drive mechanism must be connected to the take-up spool in such a way as to drive the spool fast enough to take up the slack in the film even when there is little film on the spool, and yet it must not drive the take-up spool, when it contains a greater quantity of film wound thereon, so fast as to cause excessive tension in the film and possibly break the film or damage the apparatus.

In conventional motion picture apparatus, this is accomplished by using an elastic coupling such as a friction clutch or slip clutch in a camera, or a resilient endless belt as customarily used in a projector. As distinguished from this, the present invention drives the take-up spool through a pawl and ratchet drive driven from driving mechanism operating on the form-locked principle, the form locking including a resilient connection capable of yielding when more than a predetermined degree of resistance is encountered. Thus when less than the predetermined degree of resistance is encountered, the driving mechanism, always operating through a full stroke in synchronism with the film advance mechanism, causes the pawl and ratchet drive to operate through a full stroke, the extent of operation being sufficient to take up the slack in the film when there is a relatively small amount of film wound on the take-up spool. When a greater resistance is encountered, the resilient connection in the form-locked drive can yield, so that the driving mechanism may still operate through its full stroke but the driven pawl may operate through only a fraction of its normal full stroke, thereby causing less turning of the take-up spool for each operating stroke of the driving mechanism, and avoiding too great a tension on the film.

BRIEF DESCRIPTION OF THE DRAWINGS

FIG. 1 is a schematic diagram of mechanism in accordance with a first embodiment of the invention; and FIG. 2 is a similar view illustrating a second embodiment of the invention.

DESCRIPTION OF THE PREFERRED EMBODIMENTS

Referring first to the form of the invention illustrated in FIG. 1, the film take-up shaft (on which the take-up reel or spool is mounted) is shown at 1, and is rigidly connected to the ratchet wheel or pawl wheel 2. Around this ratchet wheel 2 is an annular pawl carrier 3, carrying pawls 4 and 5 pivoted on pivot pins 6 and 7, respectively, the pawls being kept engaged with the teeth of the ratchet wheel 2 by springs 8 and 9, respectively. The pawl carrier 3 has forks 10 and 11 guided on fixed pins 12 and 13, respectively, which thus guide the pawl carrier 3 for rectilinear movement in a direction diametrical with respect to the shaft 1 and wheel 2, in the diametrical direction indicated by the arrows A/B. As the pawl carrier moves back and forth in the directions A/B, the pawls 4 and 5 will drive the ratchet wheel 2 and its shaft 1 in the direction of the arrow C. The pawl carrier 3 is reciprocated in the directions A/B by force applied to the driven pin 14 on the pawl carrier.

The driving mechanism which applies force to the pin 14 to reciprocate the pawl carrier, includes two levers 15 and 16 both pivoted on the fixed pin 17, these two levers together constituting a fork embracing the driven pin 14 of the pawl carrier. A drive lever in the form of a bellcrank lever having two arms 18 and 19, is also pivoted on the same fixed pin 17. One arm 18 of this lever has a driving pin 20 which, like the driven pin 14 of the pawl carrier, is also embraced between the fork arms 15 and 16. A draw spring 21 tends to draw the two arms 15 and 16 toward each other, keeping them normally engaged with the pins 20 and 14.

The other arm 19 of the bellcrank lever has a pin 22 engaged in the cam groove 23 of a cam on the driving shaft 24. This driving shaft 24 is driven in any conventional manner in synchronism with the film advancing mechanism of the motion picture camera or the motion picture projector, as the case may be. The shaft 24 rotates at a constant speed relative to the speed of advancement of the film past the film gate or optical gate of the camera or projector.

As the film passes through the camera or projector and the shaft 24 is correspondingly turned, the cam groove 23 causes the bellcrank lever 18, 19 to perform an oscillatory motion. The oscillation of the pin 20 causes corresponding oscillation of the fork members 15, 16 so long as the resistance to movement of the pawl carrier 3 is not so great as to cause the spring 21 to stretch. As the pin 20 moves upward, the lower arm 15 of the fork will move upward with it, causing corresponding upward movement of the driven pin 14 of the pawl carrier, and the pawl 4, engaging the ratchet wheel 2, will cause a slight turning of the ratchet wheel. During the downward stroke of the pin 20, corresponding action will occur, moving the pawl carrier 3 downwardly, and the pawl 5 will cause turning of the ratchet wheel. However, when the film becomes so tightly wound on the spool on the shaft 1, that sufficient resistance to turning is developed, the resilient fork arrangement will yield, and the pin 14 on the pawl carrier 3 need not complete the same full stroke completed by the pin 20 on the driving lever. For example, as the pin 20 moves upwardly, if there is too much resistance to corresponding full upward movement of the pin 14, the upper fork arm 16 will continue upwardly with the pin 20 but the lower fork arm 15 will be stopped by the resistance offered by the pin 14, and the spring 20 will stretch slightly. In this way, the film will alwyas be kept wound up to the desired degree of tightness or tension, but without excessive tension and without interfering with continuance of the full stroke motions of the driving bellcrank lever 18, 19 and without impeding the continued rotation of the shaft 24.

In the second embodiment of the invention, illustrated in FIG. 2, the driving train from the shaft 24 to the driven pin 14 is exactly the same, but the pawls are somewhat different. Instead of having a pair of pawls individually pivoted to the pawl carrier, as in FIG. 1, the modified construction divides the pawl carrier into two parts. The main portion 3a of the pawl carrier is guided as before on the fixed pins 12 and 13, for rectilinear movement diametrically with respect to the shaft, in the direction of the arrows A/B, and this part 3a of the pawl carrier has the driven pin 14. The second part 3' of the pawl carrier is in the form of a ring having pawls 4' and 5' formed integrally therewith. This ring 3' is pivoted to the main portion 3a of the pawl carrier by the pin 25 which engages in a slot 26 in the carrier portion 3a, the slot extending laterally with respect to the direction of motion A/B. Thus the carrier portion 3' having the integral pawls thereon moves upwardly and downwardly with the carrier portion 3a, and also is capable of a slight oscillatory movement with respect to the portion 3a, oscillating as necessary to prevent jamming of the pawls with respect to the ratchet teeth of the ratchet wheel. The shape of the pawl teeth is such as to insure that during the idle stroke of one tooth, this tooth will be cammed out of the ratchet teeth in a way to draw the opposite pawl tooth into engagement with the ratchet teeth to perform its effective operating stroke. At any given moment, only one pawl is operatively engaged with the ratchet teeth to perform an operating stroke, while the opposite pawl ratchets idly over the teeth and keeps the effective pawl in operating engagement with the teeth. When the direction reverses, the pawl which was previously the operating pawl is cammed out of the ratchet teeth, swinging the carrier 3' laterally so that the opposite pawl (previously the idle pawl) engages with the ratchet teeth for an operating stroke.

What is claimed is:

1. Film winding mechanism for motion picture apparatus comprising a ratchet wheel for turning a film take-up spool, a pawl carrier movable back and forth with respect to said wheel, pawl means mounted on said carrier for engaging teeth on said ratchet wheel to turn said ratchet wheel as said carrier is moved back and forth with respect to said ratchet wheel, and driving mechanism for moving said carrier back and forth with respect to said ratchet wheel, said driving mechanism including a driving part movable back and forth through strokes of constant amplitude, and means forming a yieldable connection between said driving part and said carrier, said yieldable connection tending to drive said carrier back and forth through full strokes of constant maximum amplitude and being formed to yield so as to permit said driving part to move fully through its strokes of constant amplitude even when resistance to rotation of said ratchet wheel prevents said carrier from moving through full strokes of its normal maximum amplitude, said yieldable connection including two jaws spring urged toward each other and embracing between them a driving element on said driving part and a driven element on said pawl carrier.

2. Mechanism as defined in claim 1, wherein said pawl carrier has a driven pin, and wherein said driving mechanism includes a pivoted driving lever carrying a driving pin in the vicinity of said driven pin, and wherein said two jaws are pivoted levers lying on opposite sides of said driving pin and said driven pin, and a spring tending to move said jaws toward each other to cause them to engage against opposite sides of each of said pins.

3. Mechanism as defined in claim 2, wherein said pivoted driving lever is mounted on a pivot pin, and wherein said jaw levers are pivoted on the same pivot pin on which said driving lever is pivoted.

4. Mechanism as defined in claim 2, wherein said driving pin (20) constitutes a stop normally determining the spacing of said jaw levers relative to each other and the position of both jaw levers relative to said driving lever.

5. Mechanism as defined in claim 1, wherein said driving part is one arm of a bellcrank lever, the other arm of which is driven back and forth by a rotating cam.

6. Mechanism as defined in claim 1, wherein said pawl means includes two spring-biased pawls each pivotally mounted on said pawl carrier independently of the other pawl.

7. Mechanism as defined in claim 1, wherein said pawl carrier includes a first carrier part guided for movement along a predetermined path relative to said ratchet wheel and a second carrier part mounted on and movable bodily with said first carrier part and also capable of limited movement with respect to said first carrier part, said second carrier part having two pawls formed integrally therewith for engaging opposite sides of said ratchet wheel.

8. Mechanism as defined in claim 7, wherein the pawls are so formed that as the two parts of the pawl carrier move back and forth with respect to the ratchet wheel, one pawl will make driving engagement with the ratchet wheel during movement in one direction while the other pawl is in non-driving relation thereto, and during movement in the opposite direction the second pawl will make driving engagement with the ratchet wheel and the first pawl will be in non-driving relation thereto.

* * * * *